United States Patent [19]

Wagner et al.

[11] 4,356,275

[45] Oct. 26, 1982

[54] AMINOPLAST FOAMS

[75] Inventors: Kuno Wagner; Manfred Dahm; Hanns P. Müller, all of Leverkusen, Fed. Rep. of Germany

[73] Assignee: Bayer Aktiengesellschaft, Leverkusen, Fed. Rep. of Germany

[21] Appl. No.: 312,225

[22] Filed: Oct. 19, 1981

Related U.S. Application Data

[63] Continuation of Ser. No. 766,680, Feb. 8, 1977, abandoned.

[30] Foreign Application Priority Data

Feb. 13, 1976 [DE] Fed. Rep. of Germany ....... 2605891

[51] Int. Cl.$^3$ ...................... C08L 61/00; C08G 12/12
[52] U.S. Cl. .................................. 521/136; 521/188; 528/44; 528/59; 528/259; 528/264
[58] Field of Search ................ 521/187, 188; 528/259, 528/264, 59, 44; 260/29.2 TN

[56] References Cited

U.S. PATENT DOCUMENTS

| | | | |
|---|---|---|---|
| 2,906,717 | 9/1959 | Sekmakas | 521/94 |
| 3,021,307 | 2/1962 | Csendes | 528/55 |
| 3,427,272 | 2/1969 | Bolinger et al. | 260/29.4 R |
| 3,931,112 | 1/1976 | Wagner et al. | 525/440 |

FOREIGN PATENT DOCUMENTS 1308468  2/1973  United Kingdom .

*Primary Examiner*—Morton Foelak
*Attorney, Agent, or Firm*—Connolly and Hutz

[57] ABSTRACT

Aminoplast foams of hardened reaction products of aldehydes and at least bifunctional modified $\alpha,\omega$-ureas which contain at least one ether, thioether, acetal, ester, ester amide and/or carbonate group and have a molecular weight of from 200 to 10,000.

3 Claims, No Drawings

AMINOPLAST FOAMS

This application is a continuation of application Ser. No. 766,680 filed Feb. 8, 1977, now abandoned.

This invention relates to flexible, semi-rigid and rigid aminoplast foams and to a process for their production.

Aminoplast foams, for example urea-formaldehyde and melamine-formaldehyde forms, are known (cf. Calvin J. Benning "Plastic Foams: the physics and chemistry of product performance and process technology", Vol. 1 and Vol. 2, John Wiley and Sons, New York 1969, and L. Unterstenhofer "Herstellen von Schaumstoffen aus Harnstoff-Formaldehyd-Harz" (production of foams from urea-formaldehyde resin) in Kunststoffe 57 (1967), pages 850–855).

"Aminoplasts" are reaction products in which in a first reaction stage aldehydes, especially formaldehyde, from N-alkylol compounds (e.g., N-methylol compounds) with the amino, imino or amide groups of a suitable reactant which react with one another in a second stage to form compounds of relatively high molecular weight.

Suitable reactants for the aldehydes are, for example, urea, thiourea, guanidine, melamine, diaminotriazines, aminodiazines, such as aminopyrimidines or aminoquinazolines, and guanazoles and other heterocyclic amino compounds, also urethanes, sulphonamides which contain one or more sulphonic acid amide groups, cyanamide, dicyanodiamide and aromatic amines, such as aniline, toluidine, xylidines, naphthylamines and phenylene diamines.

The alkylol compounds primarily formed in every case can be unstable.

The preferred aldehyde is formaldehyde; also suitable are e.g. acetaldehyde, acrolein, propionaldehyde, butyraldehyde, furfurol and crotonaldehyde.

Aminoplast foams are produced from the resin-like reaction products of the first stage ("aminoplast resin"). The reaction of the aldehyde and the amino-, imino- or amide groups containing component can be effected in an alkaline or in an acid medium. Temperature, pH-value and molar ratios are preferably selected so that highly viscous condensates with numerous alkylol groups are obtained. Upon acidification, they react with one another to form a polymer network.

Aminoplast foams can be produced by the "dispersion process" and by the "condensation process":

1. Dispersion process

An aqueous solution is prepared from the aminoplast resin, and an aqueous solution of a surfactant is added as foam former. The surfactant reduces the surface tension of the aqueous aminoplast resin solution. Air is then beaten into the solution thus obtained (for example by means of stirrers or through porous plates) to produce the foam. The foam is hardened with an acid catalyst through the formation of a polymer network.

2. Condensation process

The aqueous solution of the aminoplast resin and the foam former has added to its substances which evolve carbon dioxide with the acid catalyst, so that a blowing reaction and a cross-linking reaction take place simultaneously. Products which evolve carbon dioxide are usually very finely powdered inorganic carbonates and bicarbonates.

It is also possible to add low-boiling liquids, such as pentane or trichlorofluoromethane, as blowing agents to the aqueous resin-surfactant solutions.

An embodiment of the dispersion process is in widespread use for the production of urea-formaldehyde foams: An aqueous surfactant solution, more especially an aqueous alkyl naphthalene sulphonate solution is first beaten into a foam, an aqueous urea-formaldehyde precondensate resin solution is then worked into the preformed aqueous foam, after which the resin is condensed to completion by the addition of an acid catalyst.

However, the aminoplast foams thus obtained have a number of serious disadvantages which limit their application.

Thus, on account of the structure of the resins only rigid foams are obtained the properties of which are virtually impossible to vary.

Their structural strength is minimal. Although the foams obtained are rigid on account of the high cross-linking density, they are also extremely brittle.

It has been found that these disadvantages disappear when modified $\alpha,\omega$-ureas which, in addition to the terminal urea group, also contain urethane, ether, thioether, acetal and/or ester groups, are used as condensation components for the aldehydes.

Despite the small number of functional groups, these modified $\alpha,\omega$-ureas have comparable condensation velocities in aqueous medium to conventional aminoplasts.

Preferred modified ureas correspond to the formula

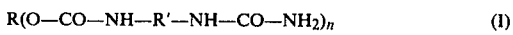

$$R(O-CO-NH-R'-NH-CO-NH_2)_n \qquad (I)$$

in which R represents an n-functional radical which contains at least one ether, thioether, acetal, ester, ester amide and/or carbonate group and which has a molecular weight of from 44 to 10,000, R' represents the radical of an at least bifunctional isocyanate and n=2, 3 or 4.

These modified $\alpha,\omega$-ureas can be converted into the N-methylol compounds in the same way as urea. They can be totally or partly replaced by $\alpha,\omega$-diurethanes, $\alpha,\omega$-biurets and $\alpha,\omega$-bis-anthranilates produced from isatoic anhydride and any polyols.

The modified ureas have an elasticising effect so that the ratio of "flexible" and "rigid" segments in the resulting foams are variable and depend onor their N-methylol compounds can be converted into aminoplast foams by known methods. The foams obtained are flexible, semirigid and rigid, depending upon the particular modified urea used.

The present invention relates to aminoplast foams of hardened reaction products of aldehydes and modified, at least bifunctional $\alpha,\omega$-ureas which contain at least one ether, thioether, acetal, ester, ester amide and/or carbonate group and which have a molecular weight of from 200 to 10,000.

The invention also relates to the use of modified $\alpha,\omega$-ureas for the production of hardened aminoplast foams by the dispersion or condensation process.

The modified $\alpha,\omega$-ureas are known. They can be obtained by reacting prepolymers produced from hydroxyl components or of compounds containing carboxyl groups and isocyanates containing NCO-groups with ammonia or ammonia solutions.

Liquid, pasty or solid modified $\alpha,\omega$-ureas are obtained, according to the type of starting materials used, i.e. polyols, compounds containing carboxyl groups or isocyanates.

The reaction of the prepolymers with ammonia may be carried out in the homogeneous phase, in which case the solvent may be remain in the solution obtained. However, it is also possible to carry out the reaction as an interfacial reaction, in which case dispersions of the α,ω-ureas in corresponding dispersants are obtained. The first case prevails, for example, when prepolymers of polyethers having a high ethylene oxide content are reacted in aqueous solution with aqueous ammonia. The second case prevails, for example, when prepolymers of hydrophobic polyethers containing a large number of propylene oxide groups are reacted in aqueous dispersion with aqueous ammonia. The solutions or dispersions obtained may be used as starting materials for producing the aminoplast foams according to the invention in the same way as the pure α,ω-ureas themselves.

Suitable starting components for producing the α,ω-ureas are aliphatic and cycloaliphatic, araliphatic, aromatic and heterocyclic polyisocyanates of the type described, for example, by W. Siefken in Justus Liebigs Annalen der Chemie, 562, pages 75 to 136, for example ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanatomethyl cyclohexane (DAS No. 1,202,785), 2,4- and 2,6-hexahydrotolylene diisocyanate and mixtures of these isomers, hexahydro-1,3- and/or -1,4-phenylene diisocyanate, perhydro-1,4'- and/or -4,4'-diphenyl methane diisocyanate, 1,3- and 1,4-phenylene diisocyanate, 2,4- and 2,6-tolylene diisocyanate and any mixtures of these isomers, diphenyl methane-2,4'- and/or -4,4'-diisocyanate, naphthylene-1,5-diisocyanate, triphenyl methane-4,4',4''-triisocyanate, polyphenyl-polymethylene-polyisocyanates of the type obtained by condensing aniline with formaldehyde, followed by phosgenation, and described, for example, in British Patent Specification Nos. 874,430 and 848,671, perchlorinated aryl polyisocyanates of the type described, for example, in German Auslegeschrift No. 1,157,601, polyisocyanates containing carbodiimide groups of the type described in German Patent Specification No. 1,092,007, diisocyanates of the type described in U.S. Pat. No. 3,492,330, polyisocyanates containing allophanate groups of the type described, for example, in British Pat. No. 994,890, Belgian Pat. No. 761,626 and published Dutch Patent Application No. 7,102,524, polyisocyanates containing isocyanurate groups of the type described, for example, in German Pat. Nos. 1,002,789; 1,222,067 and 1,027,394 and in German Offenlegungsschrifts Nos. 1,929,034 and 2,004,048, polyisocyanates containing urethane groups of the type described, for example, in Belgian Pat. No. 752,261 or U.S. Pat. No. 1,230,778, polyisocyanates containing urea groups according to German Pat. No. 1,230,778, polyisocyanates containing biuret groups of the type described, for example, in German Pat. No. 1,101,394, British Pat. No. 889,050 and French Pat. No. 7,017,510, polyisocyanates produced by telomerisation reactions of the type described, for example, in Beligan Pat. No. 723,640, polyisocyanates containing ester groups of the type described, for example, in British Pat. Nos. 956,474 and 1,072,956, in U.S. Pat. No. 3,567,736 and in German Pat. No. 1,231,688, reaction products of the above-mentioned isocyanates with acetals according to German Pat. No. 1,072,385.

It is also possible to use the distillation residues containing isocyanate groups obtained in the commercial production of isocyanates, optionally in solution in one or more of the above-mentioned polyisocyanates. It is also possible to use any mixtures of the above-mentioned polyisocyanates.

In general, it is particularly preterred to use the commercially readily available polyisocyanates, for example 2,4- and 2,6-tolylene diisocyanate and any mixtures of these isomers ("TDI"), polyphenyl-polymethylene-polyisocyanates of the type obtained by condensing aniline with formaldehyde, followed by phosgenation ("crude MDI"), and polyisocyanates, containing carbodiimide groups, urethane groups, allophanate groups, isocyanurate groups, urea groups or biuret groups ("modified polyisocyanates").

Other suitable starting components for producing the α,ω-ureas are compounds containing at least two isocyanate-reactive hydrogen atoms and having a molecular weight in the range from 60 to 10,000. In addition to compounds containing amino groups, thiol groups or carboxyl groups, compounds such as these are, preferably, polyhydroxyl compounds, especially compounds containing from 2 to 8 hydroxyl groups, especially those with molecular weights of from 100 to 10,000 and preferably from 200 to 6000, for example, polyesters, polyethers, polythioethers, polyacetals, polycarbonates and polyester amides containing at least 2, generally 2 to 8, but preferably 2 to 4 hydroxyl groups, of the type commonly used for the production of homogeneous and cellular polyurethanes.

The polyesters containing hydroxyl groups used in accordance with the invention are, for example, reaction products of polyhydric, preferably dihydric and, optionally, trihydric alcohols with polycarboxylic, preferably dicarboxylic acids. Instead of using the free polycarboxylic acids, it is also possible to use the corresponding polycarboxylic acid anhydrides or corresponding polycarboxylic acid esters with lower alcohols or their mixtures for producing the polyesters. The polycarboxylic acids may be aliphatic, cycloaliphatic, aromatic and/or heterocyclic and may optionally be substituted, for example by halogen atoms, and/or unsaturated. Examples of these polycarboxylic acids are succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixture with monomeric fatty acids, terephthalic acid dimethyl ester, terephthalic acid-bis-glycol ester. Suitable polyhydric alcohols are, for example, ethylene glycol, 1,2-propylene glycol and 1,3-propylene glycol, 1,4-and 2,3-butylene glycol, 1,6-hexane diol, 1,8-octane diol, neopentyl glycol, cyclohexane dimethanol (1,4-bis-hydroxymethylcyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example ε-caprolactone, or hydroxy carboxylic acids, for example ω-hydroxy caproic acid, may also be used.

The polyethers containing at least 2, generally 2 to 8 and preferably 2 or 3 hydroxyl groups which are used in accordance with the invention are also known per se and are obtained, for example, by polymerising epoxides such as ethylene oxide, propylene oxide, butylene oxide, tetrahydrofuran, styrene oxide or epichlorhydrin on their own, for example in the presence of BF$_3$, or by adding these epoxides, optionally in admixture or successively, with starter components containing reactive hydrogen atoms, such as alcohols or amines, for example water, ethylene glycol, 1,3- or 1,2-propylene glycol, trimethylol propane, 4,4'-dihydroxy diphenyl propane, aniline, ammonia, ethanolamine, ethylene diamine. Sucrose polyethers of the type described, for example, in German Auslegeschrifts Nos. 1,176,358 and 1,064,938, may also be used in accordance with the invention. In many cases, it is preferred to use polyethers which predominantly contain primary OH-groups (up to 90% by weight, based on all the OH-groups present in the polyether). Polyethers modified by vinyl polymers, of the type formed for example by polymerising styrene, acrylonitrile in the presence of polyethers (U.S. Pat. Nos. 3,383,351; 3,304,273; 3,523,093 and 3,110,695; German Pat. No. 1,152,536) are also suitable, as are polybutadienes containing OH-groups.

Among the polythioethers, reference is made in particular to the condensation products of thiodiglycol on its own and/or with other glycols, dicarboxylic acids, formaldehyde, aminocarboxylic acids or amino alcohols. Depending upon the co-components, the products in question are polythio mixed ethers, polythio-ether esters, polythioether ester amides.

Suitable polyacetals are, for example, the compounds obtainable from glycols, such as diethylene glycol, triethylene glycol, 4,4'-dioxethoxy diphenyl dimethyl methane, hexane diol and formaldehyde. Polyacetals suitable for use in accordance with the invention may also be produced by the polymerisation of cyclic acetals.

Suitable polycarbonates containing hydroxyl groups are those known per se which may be obtained, for example, by reacting diols, such as 1,3-propane diol, 1,4-butane diol and/or 1,6-hexane diol, diethylene glycol, triethylene glycol, tetraethylene glycol, with diaryl carbonates, for example diphenyl carbonate or phosgene.

The polyester amides and polyamides include, for example, the predominantly linear condensates obtained from polybasic saturated and unsaturated carboxylic acids or their anhydrides and polyhydric saturated and unsaturated aminoalcohols, diamines, polyamides and mixtures thereof.

Polyhydroxyl compounds already containing urethane or urea groups and optionally modified natural polyols, such as castor oil, carbohydrates, starch, may also be used. Addition products of alkylene oxides with phenol-formaldehyde resins or even with urea-formaldehyde resins may also be used in accordance with the invention.

Representatives of these compounds suitable for use in accordance with the invention are described, for example, in High Polymers, Vol. XVI, "Polyurethanes, Chemistry and Technology", by Saunders-Frisch, Interscience Publishers, New York, London, Vol. I, 1962, pages 32–42 and pages 44–54, and Vol. II, 1964, pages 5–6 and 198–199, and also in Kunststoff-Handbuch. Vol. VII, Vieweg-Höchtlen, Carl-Hanser-Verlag, Munich, 1966, for example on pages 45–71.

Cationic and anionic, short-chain condensible compounds, of the type commonly used in the production of polyurethane latices and described, for example, by D. Dieterich and H. Reiff in Z. angewandte Makromolekulare Chemie 26 (1972), 85–106 (No. 419), may similarly be used as modifying agents.

The ureas may be directly used for producing the aminoplast foams in accordance with the invention. For various reasons, however, it is often best to give them a certain content of reactive alkylol and/or alkylol ether groups (precondensates) by reaction with carbonyl compounds, i.e. in particular with aldehydes and ketones. Examples of suitable carbonyl compounds are formaldehyde, acetaldehyde, butyraldehyde, cyclohexane aldehyde, benzaldehyde, salicylaldehyde, 4-methyl benzaldehyde, terephthaldialdehyde, acetone, diethyl ketone, cyclohexanone, benzophenone or even quinones, such as benzoquinone, as reactants for ammonia.

In the process according to the invention, it is preferred to use formaldehyde in aqueous solution or even in gas form, any formaldehyde donors or compounds reacting like formaldehyde such as, for example, its semiacetals with monofunctional or polyfunctional alcohols, such as methanol, ethanol, butanol, ethylene glycol, diethylene glycol, etc., acetaldehyde, chloral, acetone, methylethylketone, methylisobutyl ketone or cyclohexanone, as reactants for the above-mentioned starting compounds preferably containing nitrogen. Aqueous formaldehyde is particularly preferred.

Although the above-mentioned, $\alpha,\omega$-ureas or their N-alkylol compounds are the preferred starting materials for aminoplast formation, it may nevertheless be advisable to modify these preferred materials with other compounds which are capable for example of formaldehyde condensation. In this way, it is possible with advantage specifically to vary the C/O/N-ratio of the aminoplasts, the physical properties of the foams such as their hardness, toughness, swellability, water retention capacity, resistance to oils and petrol, water absorption capacity, their bactericidal and fungicidal stability and also their effectiveness to suit the particular application envisaged.

The following are examples of these other compounds which may be incorporated quickly and easily by co-condensation: polyurethanes, urea and polyureas with terminal NH$_2$-groups, polyamides and poly-($\beta$-alanine) with molecular weights of up to 2000, N-methylol methyl ethers of polycaprolactam, polythiolactams, polypeptides of N-carboxy:$\alpha$-aminocarboxylic acids, low molecular weight polyamides of aliphatic dicarboxylic acids and diamine, polyamides of cycloaliphatic components and aromatic components, polyamides with O— and S— or N— as hetero atoms, polyester amides, co-condensates which, in addition to amide groups, contain ester, urethane or urea groups, ethoxylated and propoxylated monoamides and polyamides, polyhydrazides and polyaminotriazoles, polysulphonamides, phenol-formaldehyde co-condensates with urea, water-dispersible phenoplasts, latices containing amide groups of anionic or cationic polyurethane dispersions, melamine and dicyanodiamide, low molecular weight aniline-formaldehyde condensates, sulphonic acid amides, mononitriles and dinitriles, acrylonitrile, urotropin, hexahydrotriazines, condensates of primary amines and formaldehyde, Schiff's base and ketimines of polyketimines such as, for example, those of one mole of hexamethylene diamine and 2 moles of cyclohexanone, polyaddition products and polycondensation products of melamine and other aminoheterocycles with aldehydes and alcohols (for example penta- and hexamethylol melamine methyl ethers), polyadditon and polycondensation products of nitriles with aldehydes, reaction products of phosphorous acid and phosphine with carbonyl compounds. The incorporation of stilbene compounds with groups having a tendency towards N-methylol formation and other lighteners, for example those containing an unsubstituted sulphonamide group in their molecule, in proportions of from 0.5 to 20%, may also be advantageous. Reference is also made to 1,3,5-tri-(4'-sulphamylphenylamino)-triazine, melamine monomethylene acrylamide, ureido and thio-ureido compounds containing an optionally substituted vinyl group and alkylated methylol group (German Pat. No. 1,018,413), N-cycloalkyl-N'-dialkyl ureas, alkylene ethers of salicylic acid amine, benzene sulphonic acid amide, reaction products of methoxy methyl isocyanate with mono-, di- and polyamines, carbaminyl amides according to German Pat. No. 943,329, N-di-carboxylic acid monoureides, esters of α-olefin-N-dicarboxylic acid monoureides according to German Pat. No. 1,005,057, addition products and condensation products of carbonyl compounds and hydrazine carboxylic acid esters, 2-h drazino-4, -bis-diethylamino-1,3,5-triazine, monomethoxy dithiocyanatotriazine, ethylamino dithiocyanatotriazine, substituted acid hydrazides of isopropyl hydrazine and stearic acid, 2-aminothiazole, 2-aminotriazole, dichloromaleic imide, reaction products of 1 mole of methoxy methyl isocyanate and 1 mole of trimethylol aminomethane, addition products and condensation products of N-carbonyl sulphamic acid chloride with ammonia, primary amines, also maleic acid hydrazine, hydrazodicarboxylic acid diethyl ester, hydrazodicarbonamide, polyhydrazodicarbonamides, hydroxyethyl urethane, phenyl hydrazine, bis-biguanides, aminoguanidine, disodium ethylene-bis-dithiocarbamates, phosphoric and phosphorous acid amides, acylamino guanidine, benzoyl dicyanodiamide, 1,3-disubstituted 5-amino-1,2,4-triazoles according to German Pat. No. 1,241,835 and maleic acid monoamides. Further examples include polyureas of the type obtainable by the action of ammonia and monoamines on the isocyanatoaryl esters of phosphoric, thiophosphoric, phosphonic, thiophosphonic acid according to German Pat. No. 1,129,149. Also suitable are mixtures of 1,3-dimethylol-5-alkyl, hexahydro-1,3,5-triaz-2-one and methylol ureas according to German Pat. No. 1,133,386, condensation products of dicyanodiamide and nitriles, such as 2,6-diamino-4-phenyl-1,3,5-triazine (=benzoguanamine), isobutylidene diurea, α-chloroisobutylidene diurea, methacrylamidobenzene sulphonic acid-(N-methane sulphonyl)-amide, dimethylol glyoxal monoureine, dithioureas of the type which may be obtained by reacting ammonia or primary amines with the isothiocyanates according to German Pat. No. 1,241,440; also isourea ethers and isobiuret ether derivatives (German Pat. No. 1,240,844), and cyano-substituted aliphatic ureas of the type which may be obtained by reacting ammonia with cyano-substituted aliphatic isothiocyanates according to German Pat. No. 1,121,606, low molecular weight co-condensates of melamine, urea, dicyanodiamide and thiourea, methylolated polyureidopolyamides which may be produced in accordance with German Pat. No. 1,034,857 from ε-caprolactam and diethylene triamine, followed by urea condensation and formaldehyde addition. Reference is also made to the aminoplast resins of dicyanodiamide, formaldehyde and formic acid according to German Pat. No. 1,040,236, condensation products of primary amines, epichlorohydrin and urea, condensation products which may be obtained by reacting sulphomethylated phenols and mono-, di- or tri-methylol urea or methylol compounds of acid amides, ethoxylation products of diethylene triamine, water-soluble hexamethylol melamine condensates and their reaction products with epichlorohydrin, low molecular weight urea-phenol co-condensates, N,N'-dimethylol urone, methylene-bis-methylol urone methyl ether, melamine and ammeline co-condensates. It is also possible to use condensation products of trimethylol phosphine oxide and methylol melamine, co-condensates of melamine, formaldehyde and polyamines, of the type which may be obtained in accordance with German Pat. No. 1,059,659, methylol-group-containing co-condensates of 1 mole of benzoguanamine, 3 moles of melamine and 5 moles of formaldehyde, co-condensates of dicyanodiamide and formaldehyde-condensed naphthalene sulphonic acids, water-soluble condensation products of tri- and tetra-methylol melamine which may optionally be modified with other compounds capable of forming aminoplasts. Further examples include methyl-group-containing co-condensates of melamine, urea, guanidine, dicyanodiamide, formaldehyde and malonic acid diethyl ester, water-soluble resin-like condensation products of 1 mole of urea and 1 to 2 moles of acylic acid or methyacrylic acid, alkylene di-melamines of the type which can be obtained by reacting dicyanodiamide with cyanaminonitriles in the presence of KOH, condensation products of mono- and di-methylol urea or thiourea with glyoxal, modified carbamidomethylol ethers according to German Pat. No. 1,017,787, for example those of urea, melamine, butanol and methyacrylic acid, reaction products of formaldehyde condensation products of compounds of the aminotriazine group or the urea group which contain free N-methylol groups with nitriles or amides of unsaturated polymerisable or copolymerisable acids which are produced in accordance with German Pat. No. 1,005,270. Methylgroup-containing vinyloxylalkyl melamines, methylol compounds of reaction products of diisocyanates with 1 mole of ethylene imine and 1 mole of ammonia or primary amines, methacrylamide and acrylamide methylol methyl ethers, methylol compounds of N-vinyl derivatives of N,N'-alkylated cyclic ureas, such as N-vinyl-N,N'-ethylene urea, methylol compounds of amides of phosphoric and thiophosphoric acid, methylol compounds of biguanides, methylol-group-containing addition products of carbamic acid esters and glyoxal, methylol-group-containing mercapto fatty acid hydrazides of thioglycolic acid methyl ester and hydrazine. Reference is also made to formamide, tert.-butyl formamide, polyureas of tetra-ethylene pentamine and urea, methylol-group-containing quaternary ammonium derivatives of aminoacetoguanamine according to German Pat. No. 1,032,259, N-methylol compounds of biuret and N-alkylated biuret derivatives. Reference is further made to benzene sulphoallyl amide, methane sulphoallyl amide, dimethylaminosulphoallyl amide, methylol compounds of hydantoin and derivatives, methylol compounds of salicyclic acid amine, such as 5-chloro-2-oxybenzene-1-carboxylic acid-n-amylamide, dichlorophenoxy acetic acid amides, 2-amino-4-(ethylthio)-butyric acid, 2-amino-4-methoxybutyric acid, 2-amino-4-(methylsulphonyl)-butyric acid which are active against fungi, viruses, bacteria and other parasitic organisms and which may be temporarily fixed in the end products of the process through condensations of formaldehyde. Methylol compounds of low molecular weight condensation products of cyclic lactim-0-alkyl ethers, such as butyrolactim ether, valerolactim ether, caprolactim ether, with monoacylated hydrazines or urea, thiourea, bis-hydrazides and semicarbazide.

The above-mentioned nitrogen compounds capable of aminoplast formation may be used with advantage in a quantity of from 0 to 90% by weight, based on the quantity of $\beta,\omega$-urea, in the process according to the invention.

Other compounds capable of aminoplast formation which are suitable for use in the process according to the invention are, for example, polyfunctional N-formyl compounds or acetyl compounds, for example, those of hydrazine, N-methyl hydrazine, N,N'-dimethyl and diethyl hydrazine, ethylene diamine, trimethylene diamine, 1,2-diaminopropylene diamine, tetramethylene diamine, N-methyl-1,3-propylene diamine, pentamethylene diamine, trimethyl hexamethylene diamine, hexamethylene diamine, octamethylene diamine, undecamethylene diamine, diaminomethyl cyclobutane, 1,4-diaminocyclohexane, 1,4-diamino-dicyclohexyl methane, 1-methyl-2,4-diaminocyclohexane, 1-methyl-2,6-diamino-cyclohexane, m-xylylene diamine, 1-amino-3,3,5-trimethyl-5-aminomethyl cyclohexane, p-aminobenzylamine, 3-chloro-4-aminobenzylamine, hexahydrobenzidine, 2,6-dichloro-1,4-diaminobenzene, p-phenylene diamine, 2,4-tolylene diamine, 1,3,5-triisopropyl-2,4-phenylene diamine, 1,3,5-trimethyl-2,4-phenylene diamine, 1-methyl-3,5-diethyl-2,4-phenylene diamine, 1-methyl-3,5-diethyl-2,6-phenylene diamine, 4,4'-diaminodiphenyl methane and 4,4-diaminodiphenyl ether.

It has proved to be particularly valuable to use from 0.5 to 30% by weight, based on the total quantity of the aminoplast-forming starting compounds, of hitherto unknown chain terminators in the production of the aminoplasts according to the invention suitable for the production of foams. In this connection, reference is made in particular to lactams, such as ε-caprolactam, valerolactam, butyrolactam and the corresponding thiolactams. The use of these chain terminators in admixture with the more highly functional nitrogen compounds enables the viscosity of the end products to be specifically adjusted in a simple manner.

In one particular embodiment of the process according to the invention, compounds which, in addition to groups capable of aminoplast formation, also contain groups (for example chromophoric groups) which provide the aminoplast-forming starting compounds with the properties of dyes and/or lighteners, are added in a quantity of from 0.2 to 20% by weight and preferably in a quantity of from 2 to 14% by weight, based on the total quantity of the aminoplast-forming starting compounds. The incorporation of such compounds enables dyed and extremely colour-stable aminoplast foams to be produced. Examples of suitable compounds are lighteners of the following formula

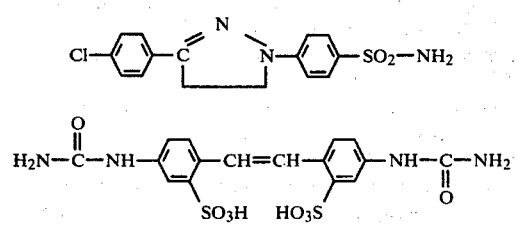

In addition to the compounds preferably used for aminoplast formation, compounds capable of so-called "phenoplast formation" may also be used for modification in a quantity of from 0.5 to 60% by weight and preferably in a quantity of from 5 to 40% by weight, based on the total quantity of the aminoplast-forming starting compounds without any reduction in the condensation velocity.

Preferred compounds capable of phenoplast formation are phenol, bisphenol, resols of phenol or bisphenol and formaldehyde, condensation products of phenol and cyclohexanone, phenol sulphonic acids and naphthalene sulphonic acids.

The production of aminoplast foams from the $\alpha,\omega$-ureas or their N-alkylol compounds or from mixtures thereof and other compounds which can be alkylated on the nitrogen, may be carried out by any of the usual methods for producing foams. Accordingly, foam formation may essentially be carried out by the dispersion and the condensation processes. Modifications of these processes are also possible. In particular, it is also possible to charge aqueous soap foams produced in the first stage with the aminoplast resins and to harden them in further stages of the process to form a polymer "backbone". In addition, it is also possible to use low-boiling liquids, such as pentane or trichlorofluoromethane, as blowing agents for producing the foams. Carboxylic acid salts of hydrazines or diamines may also be used as blowing agents.

One preferred embodiment of foam production uses the dispersion process. In this process, gases, especially air, are mechanically beaten or injected under pressure or under normal conditions into a solution of the aminoplast resin, in which surfactants are also dissolved, or the new aminoplast resins are mixed into an aqueous soap foam produced by this process.

In both cases, it is best to use mechanical apparatus. Apparatus such as these are known and are described in C. J. Benning's book entitled Plastic Foams: The physics and Chemistry of Product Performance and Process Technology, John Wiley and Sons, New York, 1969, Vol. I, pages 447 et seq, and in the Article by L. Unterstenhofer, Herstelung von Schaumstoffen aus Harnstoffe-Formaldehyde-Harz (Production of Foams from Urea-Formaldehyde Resin), Kunststoffe 57 (1967), pages 850-855.

By using the mechanical apparatus, the unit weights of the foams are reduced and their pore structure is made finer.

Foam formers are required for the production of the new aminoplast foams, especially in cases where the dispersion process is used. The function of these products is to enable foam formation to take place by reducing the surface tension of the mixture to be foamed and, by increasing film elasticity and surface viscosity, to stabilise the foam charged with the aminoplast resin until a self-stable polymer backbone has formed.

Suitable foam formers and surfactants are the known non-ionic, anionic and cationic surfactants. However, these surfactants have to be adapted to the aminoplast resin in such a way that they are compatible with one another. Only in this way is foam formation possible, in other words the preformed aqueous soap foam does not collapse when charged with the aminoplast resin. Typical representatives of such surfactants are the alkyl naphthalene sulphonates, the castor oil sulphonates, dodecyl benzene sulphonates, cetyl trimethyl ammonium bromide, ethoxylated stearyl alcohol, ethoxylated stearic acid, polyethoxylated vegetable oils, ethoxylated alkyl phenols, such as isooctyl phenol ethylene polyglycol ether or reaction products of amines with long-chain fatty acids.

The optimum effects of the surfactants cannot be predicted because they are largely determined by the nature of the aminoplast resins used. Accordingly, the optimum foam former for a special aminoplast resin must be experimentally determined from case to case.

The foam formers are generally used in a quantity of from 0.1 to 5% by weight and preferably in a quantity of from 0.3 to 3% by weight, based on the total quantity of all reaction components involved in the polycondensation reaction.

For activating aminoplast formation and hence for hardening the foam into a polymer network, it is possible to use any known condensation catalyst, for example, formic acid, hydrochloric acid, sulphuric acid, phosphoruc acid, acetic acid, thioacetic acid, maleic acid and of course also bases, such as sodium hydroxide, potassium hydroxide, calcium hydroxide, barium hydroxide, zinc oxide, magnesium oxide, acids of phosphorus, phosphates, primary and secondary potassium hydrogen phosphate, ammonium sulphate, numerous organic acid anhydrides etc., acid-liberating compounds such as ammonium chloride, trimethyl ammonium formate, chloral hydrate, an amine salt of fatty acids and other organic carboxylic acids, maleic acid semiesters and tertiary amine salts etc., dibenzoyl peroxide, carbonic acid, N-carbamic acid, glycol chlorhydrin, glycerol chlorhydrin, epichlorhydrin and various copper, zinc, Sn(II), cadmium and magnesium salts of organic acids. A variety of different metal oxides or their hydrates may also be used.

Activators preferably used in the process according to the invention are hydrochloric acid, sulphuric acid, phosphoric acid, formic acid, maleic acid, sodium hydroxide, potassium hydroxide, barium hydroxide, benzyl dimethylamine and triethylamine.

The activators are generally used in a quantity of from 0.05 to 5% by weight and preferably in a quantity of from 0.1 to 2% by weight, based on the total quantity of all the reaction components involved in the polycondensation reaction.

The production of foams from the dispersion according to the invention may, of course, be carried out in the presence of fillers, known flameproofing agents, protective colloids, additives and inorganic fillers of a variety of different kinds, in particular for example water-soluble or water-dispersible inorganic salts, double salts or complex compounds, for example ammonium sulphate, end liquors containing ammonium sulphate from the production of caprolactam, calcium sulphate, $(NH_4)_2SO_4.H_2O.Ca(H_2PO_4)_2$, ammonium phosphate, $CaNaPO_4$, $Ca_2SiO_4$, 5 $CaO.P_2O_5.SiO_2$, $Ca_4P_2O_9$, $(CaMg)O.Al_2O_3.4SiO_2$, $Al_2O_3.2SiO_2.2H_2O$, $KCl.MgSO_4.3\ H_2$, $K_2SO_4.MgSO_4.6\ H_2O$, $Si_2O_6Alk$, sodium nitrate, ammonium nitrate, secondary sodium ammonium phosphate and the like, many of the inorganic compounds mentioned often having a catalytic effect upon the foam-forming reaction. Protective colloids, such as carboxyl methyl cellulose or polyvinyl alcohol, have a stabilising effect upon the backbone during foam production so that extremely fine, cellular foams are obtained. Aqueous latices based on the known polymers may also be added to the foam mixture. Suitable latices are, for example, latices based on acrylates, methacrylates, polyurethanes, butadiene, isoprene chlororprene and styrene.

The aminoplast foams according to the invention may be produced either continuously or in batches. It is possible to produce block-form materials and also to fill cavities. In the latter case, it is possible to fill both cavities in masonry and also moulds.

In this way, it is readily possible to produce mouldings, for example motor vehicle seats, arm rests or tables in recirculation-type apparatus.

To carry out the process according to the invention, a soap foam is initially produced from a water foam former (surfactant) mixture by beating or spraying in air. An aqueous solution or dispersion of the aminoplast resin is then stirred into this soap foam, followed by the addition of a small quantity of the acid or basic catalyst. The foam hardens over a period ranging from seconds to minutes, depending upon the type and quantity of catalyst used, the content of methylol groups and the structure of the aminoplast resin. The water is removed from the foam either by heating or by simply allowing it to stand in air.

The quantity of air introduced, the manner in which it is introduced and also the composition of the aminoplast resin formulation to be foamed determine the expansion ratio of the resin solution or resin dispersion. This expansion ratio generally amounts to between 5 and 70, in other words the volume of the foam is greater by this factor than that of the liquid starting mixture.

Flexible, semi-rigid or rigid aminoplast foams with excellent flameproof properties are obtained by this process, depending upon the structure and molecular weight of the $\alpha,\omega$-urea or its N-alkylol compound and the type and quantity of other low molecular weight N-alkylol compounds used.

These aminoplast foams may be used for any purposes for which conventional foams are normally used, for example as upholstery materials, as shock absorbing and sound-absorbing materials, as insulating materials, as moisture-retaining materials, as materials for listening and improving soil, as water-absorbing materials or as structurally strong materials for the manufacture of consumer goods, such as chairs or tables. It is also possible to use the foams for absorbing oil, for treating water or for solidifying sewage. In size-reducing form, they may also be added to formulations for the manufacture of paper.

EXAMPLE 1

(a) Production of the $\alpha,\omega$-urea 23,250 g of polyethylene glycol with a molecular weight in the range from 1300 to 1600 were dehydrated for 30 minutes at 110° C./12 Torr. 30 g of p-toluene sulphonic acid were then added to the mixture 50° C., followed by the addition in one batch of 5040 g of hexamethylene diisocyanate. The reaction temperature was then increased to 100°–110° C. The mixture is stirred for 2 hours at that temperature. The NCO number of the prepolymer was then determined and amounted to 4.2% NCO (calculated: 4.45%). The prepolymer was taken up in 30 kg of acetone and added to a solution of 3450 g of 30% aqueous ammonia and 25100 g of distilled water. The acetone was then removed by distillation. A 50% aqueous paste of a bis-urea with an average molecular weight (MW) of 1920 was obtained. 100 g of solution contain 0.052 l of urea equivalents. Both here and in all the following Examples, a urea equivalent is characterised by the following structural formula: $H_2N-CO-NH-R-$.

(b) Production of a foam 100 g of a 1.75% solution of a foam former (ammonium salt of a sulphonic acid which contained as substituent a radical obtained by condensing lauryl alcohol with 4 moles of ethylene oxide) were converted into a soap foam by means of a rotating brush.

229 g of a precondensate obtained by reacting 209 g of the α,ω-diurea obtained in accordance with 1a with 20 g of 30% aqueous formaldehyde for 60 minutes at 80° C., were introduced into the resulting soap foam. After mixing for 2 minutes, 3 ml of 85% orthophosphoric acid were stirred into the precondensate-containing foam, followed by stirring for another 30 minutes. After another 3 hours, the foam had hardened and, in the wet state, had a unit weight of 172 kg/m$^3$. The foam was highly elastic.

EXAMPLE 2

Production of a foam

A mixture of 100 g of a 2.5% aqueous solution of carboxymethyl cellulose and 50 g of a 4% aqueous solution of the foam former mentioned in Example 1b was converted into an aqueous foam by passage together with air through a sieve-plate column. 458 g of a precondensate obtained by reacting 418 g of the α,ω-diurea described in Example 1a with 40 g of 30% aqueous formaldehyde for 1 hour at 80° C. were stirred into this aqueous foam. After thorough mixing, 6 ml of 85% orthophosphoric acid were stirred into the foam mixture. After 1 hour, the foam had hardened through and, in its wet state, had a unit weight of 135 kg/m$^3$. A semi-rigid foam was obtained after drying.

EXAMPLE 3

Production of a foam 100 g of a 12.5% aqueous solution of the foam former mentioned in Example 1a were converted into a soap foam by beating in air. 209 g of the α,ω-diurea mentioned in Example 1a and 20 g of 30% aqueous formaldehyde were successively mixed into the soap foam thus produced, followed after stirring for a total of 2 minutes by the addition of 3 ml of 85% orthophosphoric acid. The foam began to harden after a stirring time of 3 minutes.

EXAMPLE 4

Production of a foam

An aqueous soap foam was produced by beating air into 100 g of a 5% aqueous solution of the foam former mentioned in Example 1a.

(a) 217.8 g of a precondensate of 198.6 g of the α,ω-diurea mentioned in Example 1a with 19.2 g of 30% aqueous formaldehyde produced over a period of 60 minutes at 80° C.; and (b) 26 g of a precondensate of 6 g of urea with 20 g of 30% aqueous formaldehyde, produced over a period of 30 minutes at 80° C., were successively stirred into the aqueous foam thus produced, followed by the addition of 3 ml of 85% orthophosphoric acid. After 4 minutes, the foam had hardened, a tough, rigid foam being obtained after drying.

EXAMPLE 5

(a) Production of a α,ω-urea 620 g (0.4 Mole) of polyethylene glycol (MW 1550) and 800 mg of p-toluene sulphonic acid were mixed and dehydrated for 30 minutes at 100° C./12 Torr. 134.4 g (0.8 Mole) of hexamethylene diisocyanate were introduced in one batch into the clear solution at 70° to 80° C., after which the whole is stirred under nitrogen for 2 hours at 100° C. The NCO-content of the mixture is then determined and amounted to 4.05% NCO (calculated: 4.45%).

The NCO-prepolymer was added dropwise while still warm to a prepared aqueous NH$_3$-solution. The aqueous NH$_3$-solution contained 57 g of 22.4% ammonia and 710 g of distilled water. A 50% aqueous solution of the bis-urea with an average molecular weight of 1920 and a viscosity of 363 cP/25° C. was obtained in this way. 100 g of solution contained 0.052 urea equivalents.

(b) 100 g of an aqueous 1.75% solution of the foam former mentioned in Example 1b were converted by means of a stirrer into an aqueous soap foam. 221 g of a precondensate obtained by condensing 200 g of the above-mentioned bis-urea with 21 g of 30% aqueous formaldehyde for 40 minutes at 80° C. were stirred into this aqueous soap foam. 3 ml of 85% orthophosphoric acid were then added, again with stirring. After 2 minutes, the foam had hardened through and was highly elastic.

EXAMPLE 6

(a) Production of an α,ω-urea 155 g (0.1 mole) of polyethylene glycol (MW 1550) and 33.6 g (0.2 Mole) of hexamethylene diisocyanate were reacted as in Example 5 in the presence of 200 mg of p-toluene sulphonic acid to form the prepolymer.

% NCO 4.5 determined; 4.45 calculated.

The prepolymer was then added dropwise to an aqueous ammonia solution which had the following concentration: 40 g of 20% aqueous NH$_3$ solution and 150 g of distilled water. Following addition of the prepolymer, the excess ammonia was reacted to form urotropin by the addition of 9 ml of 37% formalin solution. The residual clear solution was then diluted with 68 g of distilled water to a solids content of 50%. 100 g of solution contained 0.0439 urea equivalents.

(b) Production of a foam 83 g of a 1.75% aqueous solution of the foam former mentioned in Example 1b were passed together with air against gravity through a sieve-plate column, resulting in the formation of a fine-pored aqueous soap foam. 221 g of a precondensate obtained by reacting 200 g of the above-mentioned α,ω-urea with 21 g of 30% aqueous formaldehyde for 60 minutes at 80° C. were stirred into the aqueous soap foam thus produced. After thorough mixing, a mixture of 3 ml of 85% orthophosphoric acid and 17 ml of water was added, followed again by thorough stirring. The foam had hardened after 7 minutes.

EXAMPLE 7

(a) Production of an α,ω-urea 310 g (0.2 Mole) of polyethylene glycol with an MW of 1550, 21.2 g (0.2 Mole) of diethylene glycol, 100 mg of p-toluene sulphonic acid and 134.4 g (0.8 Mole) of hexamethylene diisocyanate were reacted as in Example 5 to form the prepolymer.

% NCO calculated: 7.2. % NCO observed: 7.0.

The prepolymer was stirred hot into an aqueous ammonia solution. The ammonia solution consisted of 59 g of 24.3% NH$_3$-water and 300 g of distilled water. Finally, the excess ammonia was removed by the addition of 34 ml of 37% formalin, after which the solution was diluted to a solids content of 50% by the addition of 100 g of water. The bis-urea formed had an average molecular weight MW of 1198. 100 g of solution contain 0.0836 urea equivalents.

(b) Production of a foam

An aqueous soap foam was produced by mechanically beating air into 100 g of a 1.75% aqueous solution of the foam former mentioned in Example 1b. 233 g of a precondensate obtained by condensing 200 g of the above bis-urea with 33 g of 30% aqueous formaldehyde over a period of 25 minutes at 80° C. were stirred into the aqueous soap foam thus produced. 3 ml of 85% orthophosphoric acid were then stirred into the foam. After 3 minutes, the foam had hardened. The foam formed was elastic and, after drying, had a unit weight of 178 kg/m³.

EXAMPLE 8

(a) Production of an α,ω-urea 413 g (0.1 mole) of a polyether with the idealised structural formula

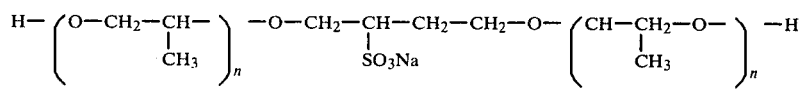

n=1.9 (produced in accordance with German Offenlegungsscrift No. 2,417,664) were dehydrated for 30 minutes at 100° C./12 Torr. 200 g of dimethyl formamide and 336 g (2 moles) of hexamethylene diisocyanate were then added to the diol sulphonate; the solution was kept at 100° C. for 1 hour.

NCO Calculated: 8.9%. NCO Observed: 8.7%.

The prepolymer solution was then introduced into a prepared aqueous ammonia solution. The ammonia solution contained 148 g (23.7% aqueous NH₃) and 468.5 g of distilled water. A 50% aqueous paste of the corresponding bis-urea containing sulphonate group was obtained in this way. 100 g, of solution contained 0.128 urea equivalents.

(b) Production of a foam 100 g of a 1.75% aqueous solution of the foam former mentioned in Example 1b were converted into a soap foam by beating in air. 251 g of a precondensate obtained by condensing 200 g of the above compound with 51 g of 30% aqueous formaldehyde over a period of 20 minutes at 80° C. were stirred into this soap foam which was then hardened by the addition of 3 ml of 85% orthophosphoric acid.

After a hardening time of 10 minutes at room temperature, a tough rigid aminoplast foam had formed.

EXAMPLE 9

(a) Production of an α,ω-urea 1150 g of an 45% aqueous solution of sodium N-(2-aminoethyl)-2-aminoethane sulphonate were poured over 407.5 g of urea, followed by heating under reflux for 4 hours to 108°-110° C. The oil bath temperature was 175°-185° C. Ammonia was vigorously evolved in the meantime. The water was then removed by distillation. A yellowish viscous resin was obtained, 200 g of 50% ethanol being added to it for purification. Water and ethanol were then separated off from the resin by distillation after thorough mixing. 810 g of sodium-N-aminocarbonyl-N,N-(2-aminocarbonylaminoethyl)-2-aminoethane sulphonate, in the form of a glass-hard, brittle readily water-soluble resin, were obtained. 500 g of the above described bis-urea were then dissolved in 500 g of distilled water. The resulting 50% solution was clear and thinly viscous. 100 g of solution contain 0.3623 urea equivalents.

(b) Production of a new aminoplast foam

This Example is intended to show how a tough rigid foam is formed by admixing the sulphonate prepared as described above with a urea-formaldehyde foam.

To being with, two precondensates were prepared. A. 6 g of 30% aqueous formaldehyde were added to 15 g of the above-mentioned aqueous solution of the bis-urea, followed by heating for 30 minutes to 80° C.

The solution formed was pale brownish in colour and highly viscous. B. 170 g of 30% aqueous formaldehyde solution were added to 70 g of urea, followed by condensation for 30 minutes at 80° C. Both aqueous precondensates were stirred into an aqueous soap foam obtained from 46 g of a 1.75% solution of the foam former mentioned in Example 1b. Following the addition of 3 ml of 85% aqueous formaldehye solution, a tough rigid white foam was formed after a hardening time of 2 minutes. After drying, this foam had a unit weight of 40 kg/m³.

(c) Production of a comparison foam

In this Example, a urea-formaldehyde foam was produced in accordance with the prior art. It is intended to demonstrate that this foam is extremely brittle.

257 g of a precondensate obtained by reacting 182 g of 30% formaldehyde with 75 g of urea for 20 minutes at 80° C. were stirred into an aqueous soap foam obtained from 50 g of a 1.75% aqueous solution of the foam former mentioned in Example 1b. 30 ml of 85% orthophosphoric acid were then stirred in. After a hardening time of 2 minutes, a hard white foam with a unit weight of 38 kg/m³ had formed and was so brittle that the foam was indented even by light finger pressure.

EXAMPLE 10

(a) Production of an α,ω-urea 336 g (2 moles) of hexamethylene diisocyanate were heated under nitrogen with stirring to 150° C. A solution of 200 mg of p-toluene sulphonic acid in 370 g (1 mole) of octaethylene glycol was then added dropwise to the isocyanate.

The NCO-number of the prepolymer was then determined:

% NCO calculated: 11.6; observed: 11.9.

The prepolymer was dissolved in 185 g of dimethyl formamide, followed by the dropwise addition of a prepared solution of 159 g (22.5% aqueous NH₃) and 491 g of distilled water. A 50% aqueous paste of the bis-urea was obtained in this way. 100 g of solution contain 0.127 urea equivalents.

(b) Production of a foam 200 g of the above paste were condensed for 60 minutes at 80° C. with 51 g of 30% aqueous formaldehyde. The 251 g of condensate obtained were stirred into a soap foam obtained from 100 g of a 1.75% aqueous solution of the foam former mentioned in Example 1b. 6 ml of an 85% orthophosphoric acid were then added to the foam. After a gel time of 3 minutes, a flexible highly elastic foam was formed and, in its wet state, had a unit weight of 140 kg/m³ and, in its dry state, a unit weight of 90 kg/m³.

EXAMPLE 11

(a) Production of an α,ω-urea 369.6 g (2.2 moles) of hexamethylene diisocyanate were heated to 120° C. with 0.15 ml of p-toluene sulphonic acid methyl ester. 194 g (1 mole) of tetraethylene glycol were then added dropwise in the absence of a heating source so that the temperature of the reaction mixture did not exceed 120° C. Thereafter the prepolymer had an NCO-number of 17.7%. Calculated: 17.9%. The prepolymer melt was cooled and diluted with 600 g of dimethyl formamide.

This solution was then added dropwise to a prepared solution of 175 g of 24% aqueous ammonia in 268 g of distilled water. Finally, 21 g of 37% formalin were added to the solution. Thereafter the 36% solution had a pH-value of 7.0.

(b) Production of a foam

An aqueous soap foam was produced from 50 g of a 1.75% aqueous solution of the foam former mentioned in Example 1b. 100 g of the above described solution of the α,ω-urea, 30 g of 30% aqueous formaldehyde solution and 3 ml of 85% orthophosphoric acid were then successively stirred into this aqueous soap foam. After 15 minutes, hardening of the foam had ceased. The foam formed was semi-rigid and had a unit weight of 100 kg/m$^3$ in its wet state and a unit weight of 45 kg/m$^3$ in its dry state.

EXAMPLE 12

Production of a foam

An aqueous soap foam was produced from 100 g of a 1.75% aqueous solution of the foam former mentioned in Example 1b. 66 g of a standard commercial-grade anionic polyurethane dispersion and 230 g of a precondensate, obtained by condensing 200 g of the solution of the α,ω-urea, prepared as in Example 11a with 30 g of 30% aqueous formaldehyde over a period of 10 minutes at 80° C., were successively added to the aqueous soap foam thus prepared. After this foam had been thoroughly mixed, 3 ml of 85% orthophosphoric acid were added to it, as a result of which the foam began to harden. After 3 minutes, the foam had hardened into a rigid wet foam which, after drying, was extremely tough and had a unit weight of 90 kg/m$^3$.

EXAMPLE 13

(a) Production of an α,ω-urea 310 g (0.2 mole) of polyethylene glycol of MW 1550, 13.4 g (0.1 mole) of trimethylol propane and 0.4 g of p-toluene sulphonic acid were dehydrated for 1 hour at 100° C./12 Torr. Thereafter 117.5 g (0.7 mole) of hexamethylene diisocyanate were added, after which the mixture was stirred under nitrogen for 1.5 hours at 90°-100° C. The NCO-content of the prepolymer then amounted to 5.97% (calculated 6.6%). The prepolymer was then stirred into a prepared solution of 49.5 g of 25.2% NH$_3$-solution in 400 g of distilled water. An aqueous, low-viscosity stable polyurea solution was formed in this way. 100 g of solution contained 0.0773 urea equivalents.

(b) Production of a foam

A mixture of 25 g of a 1.75% aqueous solution of the foam former mentioned in Example 1b, 3.9 g of 30% aqueous formaldehyde solution and 2 ml of 85% orthophosphoric acid was beaten by means of a mechanical stirrer into an aqueous soap foam into which 50 g of the polyurea solution prepared as in Example 13a were mixed. After 10 minutes, the foam had hardened into a flexible highly elastic foam.

We claim:

1. An aminoplast foam consisting of a hardened reaction product of an aldehyde and an at least bifunctional modified α,ω-urea having a molecular weight of from 200 to 10,000 and corresponding to the formula

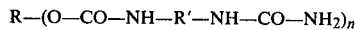

in which R represents an n-functional radical which contains at least one of ether, thioether, acetal, ester, ester amide and carbonate groups and has a molecular weight of from 44 to 10,000, and R' represents the radical of an at least bifunctional isocyanate and n is an integer from 2 to 4.

2. An aminoplast foam as claimed in claim 1, wherein the aldehyde is formaldehyde.

3. An aminoplast foam as claimed in claim 1, wherein the α,ω-urea is partly replaced by an α,ω-diurethane, an α,ω-biuret, or an α,ω-bis-anthranilate produced from an isotoic anhydride and a polyol.

* * * * *